(12) United States Patent
Kunzinger

(10) Patent No.: US 6,931,529 B2
(45) Date of Patent: Aug. 16, 2005

(54) ESTABLISHING CONSISTENT, END-TO-END PROTECTION FOR A USER DATAGRAM

(75) Inventor: Charles A. Kunzinger, Morrisville, NC (US)

(73) Assignee: International Business Machines Corporation, Armonk, NY (US)

(*) Notice: Subject to any disclaimer, the term of this patent is extended or adjusted under 35 U.S.C. 154(b) by 843 days.

(21) Appl. No.: 09/754,893

(22) Filed: Jan. 5, 2001

(65) Prior Publication Data

US 2002/0091921 A1 Jul. 11, 2002

(51) Int. Cl.⁷ ................................................ H04L 9/00
(52) U.S. Cl. ..................... 713/153; 713/200; 713/201
(58) Field of Search .............................. 713/200–201, 713/168, 160, 150, 153, 171, 189, 154; 709/200; 370/392, 351, 400–401, 409, 464

(56) References Cited

U.S. PATENT DOCUMENTS

| | | | |
|---|---|---|---|
| 5,115,466 A | * | 5/1992 | Presttun ....................... 380/257 |
| 5,790,548 A | * | 8/1998 | Sistanizadeh et al. ....... 370/401 |
| 5,802,178 A | | 9/1998 | Holden et al. |
| 5,835,726 A | | 11/1998 | Shwed et al. .......... 395/200.59 |
| 5,884,025 A | | 3/1999 | Baehr et al. ................. 395/187 |
| 5,940,591 A | | 8/1999 | Boyle et al. ........... 395/187.01 |
| 5,983,350 A | | 11/1999 | Minear et al. ............... 713/201 |
| 6,052,788 A | | 4/2000 | Wesinger, Jr. et al. ...... 713/201 |
| 6,055,236 A | | 4/2000 | Nessett et al. ............... 370/389 |
| 6,055,575 A | | 4/2000 | Paulsen et al. .............. 709/229 |
| 6,067,620 A | | 5/2000 | Holden et al. |
| 6,076,168 A | | 6/2000 | Fiveash et al. .............. 713/201 |
| 6,079,020 A | | 6/2000 | Liu ............................... 713/201 |
| 6,304,973 B1 | | 10/2001 | Williams |
| 6,330,562 B1 | * | 12/2001 | Boden et al. ................... 707/10 |
| 6,484,257 B1 | * | 11/2002 | Ellis ............................. 713/153 |
| 6,636,520 B1 | | 10/2003 | Jason et al. |
| 6,678,827 B1 | | 1/2004 | Rothermel et al. |
| 6,693,878 B1 | * | 2/2004 | Daruwalla et al. .......... 370/235 |

OTHER PUBLICATIONS

IBM Technical Disclosure Bulletin, vol. 32, No. 9A. Feb. 1990, Session–Based Secure Communication for Secure Xenix, pp. 239–243.
IBM Technical Disclosure Bulletin, vol. 37, No. 02B, Feb. 1994, Security Implementation at Internet Protocol Layer for TCIP/I, pp. 683–686.
IBM Technical Disclosure Bulletin, vol. 35, No. 4A, Sep. 1992, "Virtual Private Networks on Vendor Independent Networks", pp. 326–329.
Stallings, William *Cryptography and Network Security*. 1999 Prentice–Hall, Inc. 2nd Edition; pp. 399–440.

* cited by examiner

*Primary Examiner*—Hosuk Song
(74) *Attorney, Agent, or Firm*—Marcia L. Doubet

(57) ABSTRACT

A method, system, and computer program product for providing consistent, end-to-end protection within a computer network for user datagrams (i.e. packets) traveling through the network. The network may comprise network segments that are conventionally assumed to be secure (such as those found in a corporate intranet) as well as network segments in non-secure networks (such as the public Internet or corporate extranets). Because security breaches may in fact happen in any network segment when datagrams are unprotected, the present invention discloses a technique for protecting datagrams throughout the entire network path by establishing cascaded tunnels. The datagrams may be exposed in cleartext at the endpoints of each tunnel, thereby enabling security gateways to perform services that require content inspection (such as network address translation, access control and authorization, and so forth). The preferred embodiment is used with the "IPSec" (Internet Protocol Security Protocol) and "IKE" (Internet Key Exchange) protocols, thus providing a standards-based solution.

45 Claims, 11 Drawing Sheets

ESTABLISHING CONSISTENT, END-TO-END PROTECTION FOR A USER DATAGRAM

BACKGROUND OF THE INVENTION

1. Field of the Invention

The present invention relates to a computer system, and deals more particularly with a method, system, and computer program product for providing consistent, end-to-end protection within an arbitrary computer network for user datagrams (i.e. packets) traveling through the network.

2. Description of the Related Art

Cryptography is a security mechanism for protecting information from unintended disclosure by transforming the information into a form that is unreadable to humans, and unreadable to machines that are not specially adapted to reversing the transformation back to the original information content. The cryptographic transformation can be performed on data that is to be transmitted electronically, such as an electronic mail message or an electronic document requested by a user of the Internet, and is equally useful for data that is to be securely stored, such as the account records for customers of a bank or credit company.

The transformation process performed on the original data is referred to as "encryption". The process of reversing the transformation, to restore the original data, is referred to as "decryption". The terms "encipher" and "decipher" are also used to describe these processes, respectively. A mechanism that can both encipher and decipher is referred to as a "cipher".

Use of a "key" during the encryption and decryption processes helps make the cipher more difficult to break. A key is a randomly-generated number factored into operation of the encryption to make the result dependent on the key. The value used for the key in effect "personalizes" the algorithm, so that the same algorithm used on the same input data produces a different output for each different key value. When the value of this key is unknown to unauthorized persons, they will not be able to duplicate or to reverse the encryption.

One of the oldest and most common security systems today is what is known as a "private key" or "symmetric" security system. Private key systems involve two users, both of whom have a shared secret (or private) key for encrypting and decrypting information passed between them over a network. Before communications can occur, the two users must communicate in some secure manner to agree on this private key to ensure the key is known only to the two users. An example of a cipher used for private key security is the Data Encryption Algorithm ("DEA"). This algorithm was developed by scientists of the International Business Machines Corporation ("IBM"), and formed the basis of a United States federal standard known as the Data Encryption Standard ("DES"). Private key systems have a number of drawbacks in an open network environment such as the Internet, however, where users will conduct all communications over the open network environment and do not need or want the added overhead and expense of a separate secure means of exchanging key information before secure network communications occur.

To address the limitations of private key systems, security systems known as "public key", or "asymmetric", systems evolved. In a public key system, a user has a key pair that consists of a private key and a public key, both keys being used to encrypt and decrypt messages. The private key is never to be divulged or used by anyone but the owner. The public key, on the other hand, is available to anyone who needs to use it. As an example of using the key pair for encrypting a message, the originator of a message encrypts the message using the receiver's public key. The receiver then decrypts the message with his private key. The algorithm and the public key used to encrypt a message can be exposed without compromising the security of the encrypted message, as only the holder of the associated private key will be able to successfully decrypt the message. A key pair can also be used to authenticate, or establish the identity of, a message originator. To use a key pair for authentication, the message originator digitally signs the message (or a digest thereof) using his own private key. The receiver decrypts the digital signature using the sender's public key. A common means of publishing a public key to be used for a particular receiver is in an X.509 certificate, also known as a "digital identity".

Public key encryption is generally computationally expensive, having numerous exponentiation operations. It also requires much longer key material than a symmetric key algorithm to provide equivalent security. Hence it is used sparingly, preferably only for cryptographic operations that need its unique properties. Symmetric key encryption is more widely used for bulk data encryption/decryption, because it demands less of the CPU, using primarily repeated shift, rotate, exclusive OR, and table lookup operations.

Public and symmetric key encryption methods are often combined. One example of their combination is the Internet Key Exchange (IKE) protocol of the IP Security Protocol (commonly referred to as "IPSec"). IKE is defined in the Internet Engineering Task Force (IETF) document RFC 2409, "The Internet Key Exchange (IKE)", dated November 1998.␣LPSec is defined in RFC 2401, "Security Architecture for the Internet Protocol", also dated November 1998.

IPSec provides security services for traffic at the network layer, or IP (Internet Protocol) layer, of a communications network through use of both cryptographic and protocol security mechanisms. IPSec is designed for protecting data in transit across a non-secure network. IPSec makes no distinctions between public networks such as the Internet and private networks such as a corporate intranet, and can be deployed on either type of network. IPSec may operate at either a host (i.e. an endpoint) or at an intermediate security gateway (including routers and firewalls that provide the functionality of IPSec). The security services available in IPSec include data confidentiality (i.e. encryption), data integrity, data origin authentication, and access control. IPSec may be used to protect packets between two hosts, between a host and a security gateway, or between two security gateways.

"Tunnels" are used by IPSec (as well as by other network security techniques) to provide a secure exchange over a path through a non-secure network such as the Internet, thereby establishing a "Virtual Private Network" or "VPN", as is well known in the art. A tunneling mode is defined in IPSec, wherein the IP content within a packet is protected according to a selected set of security services. Security associations are created for transmitting packets, where a security association ("SA") is a logical 1-directional connection defined for purposes of specifying and enforcing the security services to be used. A security association may be created between two hosts, between two security gateways, or between a host and a security gateway. The SA reflects the security services that have been negotiated for the underlying path. For example, if encryption and authentication are required for some communications between particular entities, but only encryption (and not authentication) is required for other communications between these entities, then two separate security associations will be created. The set of security services applicable to an SA are also referred to as a "security policy".

Tunneled packets in IPSec have an outer IP header whose source and destination addresses identify the endpoints of the tunnel, and an inner IP header whose source and destination addresses identify the originator and recipient of the packet. When IPSec is used in "tunnel" mode, the complete inner packet, which is comprised of both the inner header and the payload, is protected as the packet travels through the tunnel. However, the outer header remains in clear text form as the packet travels through the tunnel. The protection applied to the complete inner packet can be encryption alone, authentication alone, or both encryption and authentication, as specified by the relevant security association negotiated between the tunnel endpoints.

IKE may be used to securely negotiate security associations between the two endpoints of an IPSec tunnel, and to exchange authenticated material from which each endpoint can derive the symmetric keys that will be used for protecting data transmitted on that tunnel. The IKE message exchange comprises two phases. In the first phase, a negotiation is performed, and a secure authenticated control channel (an IKE SA) is established using negotiated attributes (including an encryption algorithm, hashing algorithm, and authentication method). In the second phase, an SA is negotiated on behalf of a security service such as IPSec to establish a secure "traffic" channel for exchanging packets between a pair of communicating end systems.

The steps in a typical phase 1 are: (1) offer and acceptance of the attributes of the IKE SA, which will protect the subsequent IKE negotiation messages; (2) an unauthenticated Diffie-Hellman exchange of keying material that will subsequently be used to derive symmetric encryption and authentication keys for protecting both the IKE messages (i.e. the control flows) and user traffic; and (3) a mutual authentication step that allows each party to authenticate itself to the other using strong cryptographic techniques (thereby ensuring the authenticity of the Diffie-Hellman keying exchange). The phase 2 exchange is then performed to negotiate the IPSec SA, which will be used subsequently to protect user traffic. Furthermore, the packets of the user traffic on a particular IPSec SA will be tightly bound to the authenticated identities of the two entities that completed the successful IKE phase 1 negotiation for that IPSec SA, and will be protected according to the security policies that the entities agreed would be applicable to the IPSec SA.

Prior art systems which use IPSec and IKE typically assume that traffic flowing through an intranet does not need to be protected, and thus encryption is not applied until a security gateway prepares packets for transmission into a network that is assumed to be non-secure. Experience has shown, however, that this may not be a valid set of assumptions. Many corporate security breaches are in fact committed by insiders (such as employees) who have access to the corporate network by virtue of the corporation's intranet. A report prepared by the Computer Security Institute in March of 1999 showed that unauthorized access by insiders was on the rise, with more than half of the organizations that were surveyed reporting that they had encountered unauthorized accesses by employees. Thus, it is preferable to provide end-to-end protection for user datagrams throughout the entire path through the network.

One technique for providing end-to-end protection is to establish a security association between the two endpoints of the application (i.e. between the client and server). However, there are several disadvantages in this approach. Any intermediate systems in the network path are prevented from accessing the cleartext data content of the transmitted packets, because only the two endpoints are able to encrypt and decrypt the packets on this SA. The security gateways that may be positioned in the network path then function only to forward the encrypted content, and cannot provide services such as network address translation or dynamic packet routing, packet filtering, access control and authorization verification, and so forth. These types of services require the security gateways to have access to the packet content in cleartext form.

RFC 2409 and RFC 2401 describe the mandatory and optional functions and features of the IPSec and IKE protocols, but they do not provide information on how to configure this collection of "piece parts" into a consistent end-to-end solution that addresses practical computing environment configurations in which IPSec will typically be deployed.

Accordingly, what is needed is a technique for providing consistent, end-to-end protection for user datagrams throughout the network path they travel, whether over secure or non-secure networks, while still allowing the packet content to be surfaced in cleartext form in security gateways.

SUMMARY OF THE INVENTION

An object of the present invention is to provide consistent, end-to-end protection for user datagrams throughout the network path they travel, whether over secure or non-secure networks.

Another object of the present invention is to provide this technique in a manner that allows the packet content to be surfaced in cleartext form in security gateways.

Yet another object of the present invention is to provide this technique by establishing cascaded tunnels through the network path.

A further object of the present invention is to provide this technique such that the cascaded tunnels are logically interlocked, thereby providing a consistent approach to protecting a datagram throughout its network path.

Still another object of the present invention is to provide this technique in a manner that is automatic and transparent to the client and server endpoints, such that no additional code must be installed in a client or server device.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a method, system, and computer program product for providing end-to-end protection for user datagrams. In a first aspect, this technique comprises: independently securing each of a plurality of network segments that comprise a network path from a first computer to a second computer, wherein a datagram originator at the first computer sends at least one datagram to a datagram destination at the second computer, while each of one or more gateways in the network path retains cleartext access to datagrams sent on the network path.

In a second aspect, this technique comprises protecting each of a plurality of network segments that comprise a network path from a datagram originator to a datagram destination, which further comprises (1) establishing a first protected network segment from the datagram originator to a first gateway in the network path; (2) cascading zero or more protected gateway-to-gateway segments from the first gateway to each of zero or more successive gateways in the network path; and (3) cascading a last protected network segment from a final one of the gateways to the datagram destination, wherein the final gateway may be identical to the first gateway if no gateway-to-gateway segments are required. The first gateway and each of the zero or more successive gateways retains cleartext access to datagrams sent on the network path.

These aspects preferably further comprise using strong cryptographic techniques to establish security associations in the establishing and the cascading. The strong cryptographic techniques used for the security associations are preferably provided by IKE and IPSec. The datagram originator and the gateways that perform the cascading preferably each act in an IKE initiator role.

The cascading preferably further comprises using identifying information from the first protected network segment as identifying information of the protected gateway-to-gateway segments and the protected final network segment. The identifying information preferably further comprises addresses of the datagram originator and the datagram destination. The identifying information may also further comprise a protocol identification and a port number used for the first protected network segment. The identifying information is preferably copied from an inbound side of each gateway to an outbound side of that gateway. The identifying information may be altered by zero or more of the gateways.

In these aspects, any of the gateways may perform services on the cleartext datagram, and the cascading may be selectively enabled for any particular network path. In this latter case, the selective enablement preferably occurs by setting a cascading-enabled flag for the first protected network segment, and datagram sent on the network path are not protected using cascaded tunnels when the cascading is disabled.

The present invention will now be described with reference to the following drawings, in which like reference numbers denote the same element throughout.

DESCRIPTION OF THE PREFERRED EMBODIMENT

Figure 1:
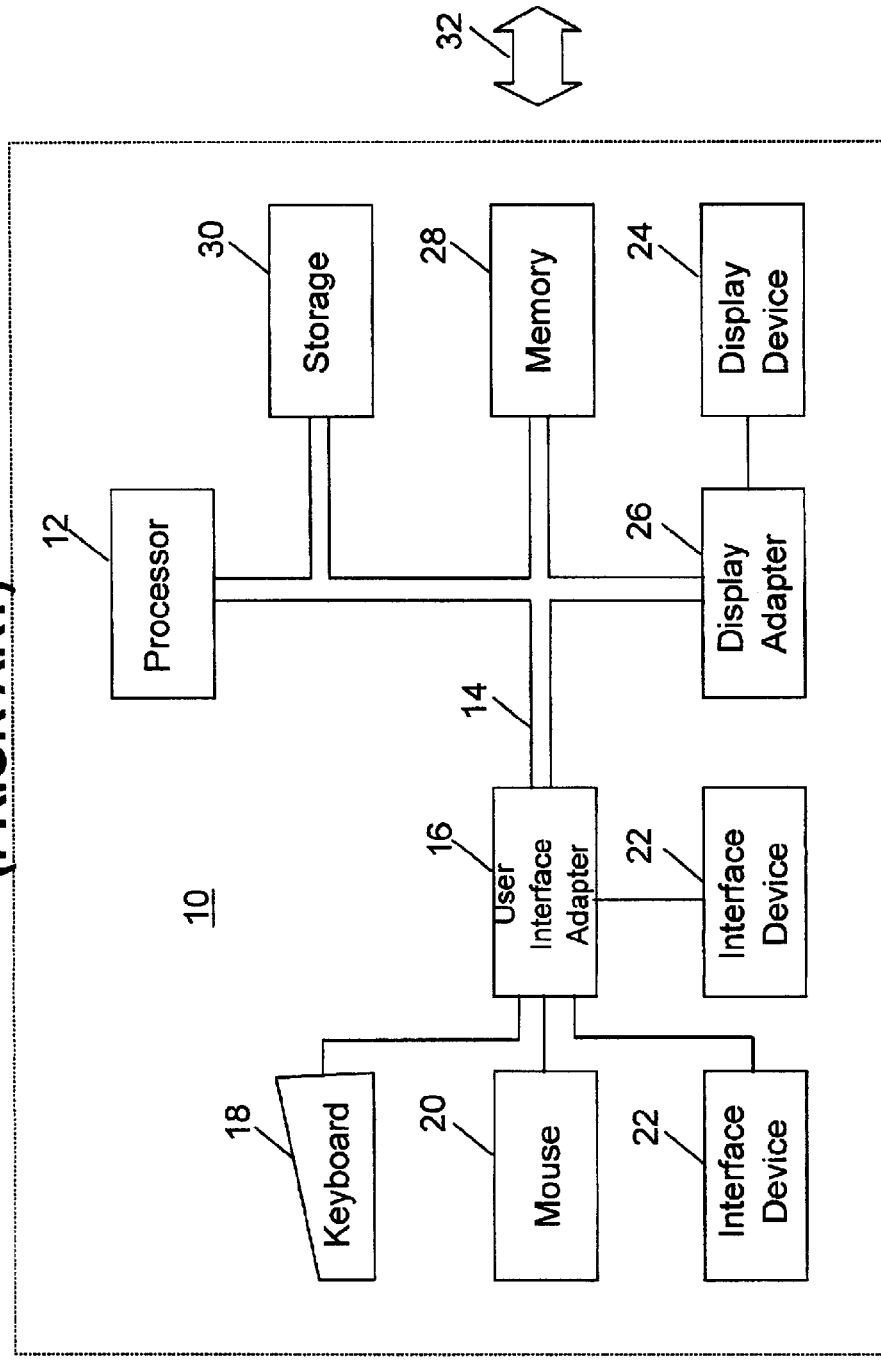
FIG. 1 is a block diagram of a computer hardware environment in which the present invention may be practiced.

FIG. 1 illustrates a representative computer hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate with other computers or networks of computers, for example via a communications channel or modem 32. Alternatively, the workstation 10 may communicate using a wireless interface at 32, such as a CDPD (cellular digital packet data) card. The workstation 10 may be associated with such other computers in a local area network (LAN) or a wide area network (WAN), or the workstation 10 can be a client in a client/server arrangement with another computer, etc. All of these configurations, as well as the appropriate communications hardware and software, are known in the art.

Functions of the present invention typically operate in machines such as gateways (including firewalls and routers). The architecture and components of such machines is similar to that depicted in FIG. 1 (except that the user interface elements are sometimes omitted). The differences between the components of gateways, as contrasted to workstation machines, are well known and will not be described in detail herein.

Figure 2:
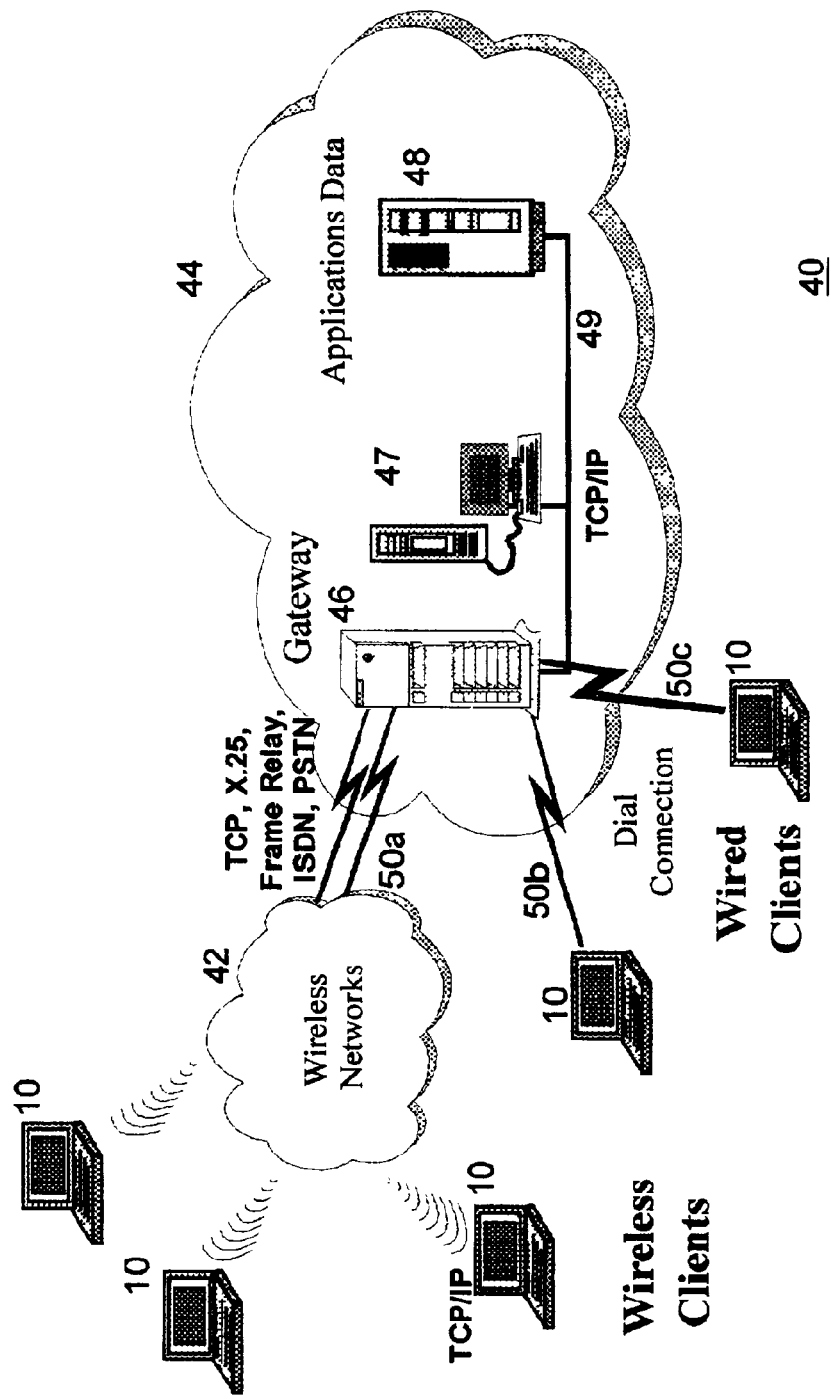
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and network 44, each of which may include a plurality of individual workstations 10. Additionally, as those skilled in the art will appreciate, one or more LANs may be included (not shown), where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may also be directly coupled to one or more workstations 10 using a communications link 50b, 50c. The gateway computer 46 may be implemented utilizing an Enterprise Systems Architecture/370 available from the International Business Machines Corporation (IBM), an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.)

The gateway computer 46 may also be coupled 49 to a storage device (such as data repository 48). Further, the gateway 46 may be directly or indirectly coupled to one or more workstations 10.

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in Texas, and one or more of the workstations 10 may be located in New York. The workstations 10 may connect to the wireless network 42 using a networking protocol such as the Transmission Control Protocol/Internet Protocol ("TCP/IP") over a number of alternative connection media, such as cellular phone, radio frequency networks, satellite networks, etc. The wireless network 42 preferably connects to the gateway 46 using a network connection 50a such as TCP or UDP (User Datagram Protocol) over IP, X.25, Frame Relay, ISDN (Integrated Services Digital Network), PSTN (Public Switched Telephone Network), etc. The workstations 10 may alternatively connect directly to the gateway 46 using dial connections 50b or 50c. Further, the wireless network 42 and network 44 may connect to one or more other networks (not shown), in an analogous manner to that depicted in FIG. 2.

Software programming code which embodies the present invention is typically accessed by the microprocessor 12 (e.g. of workstation 10, server 47, and/or an intermediary such as gateway 46) from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed from the memory or storage of one computer system over a network of some type to other computer systems for use by such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

An end user of the present invention may connect his computer to a server using a wireline connection, or a wireless connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The user's computer may be any type of computer processor, including laptop, handheld or mobile computers; vehicle-mounted devices; desktop computers; mainframe computers; etc., having processing capabilities. The remote server and the gateway machines, similarly, can be one of any number of different types of computer which have processing and communication capabilities. These techniques are well known in the art, and the hardware devices and software which enable their use are readily available. Hereinafter, the user's computer will be referred to equivalently as a "workstation" or "client", and use of any of these terms or the term "server" or "gateway" refers to any of the types of computing devices described above.

In the preferred embodiment, the present invention is implemented as one or more computer software programs. The software typically operates on an intermediary (i.e. a gateway, firewall, or router) in a network, as one or more modules (also referred to as code subroutines, or "objects" in object-oriented programming). The server or intermediary may be providing services in an Internet environment, in a corporate intranet or extranet, or in any other networking environment. Alternatively, functions of the present invention may be implemented in hardware, or in a combination of hardware and software.

The present invention defines a novel technique for providing consistent, end-to-end protection for user datagrams traveling through a network by establishing one or more cascaded tunnels. The use of cascaded tunnels (as opposed to a single tunnel or SA extending from the client to the server) allows security protection to be tailored to the requirements of a particular network segment, having security policies that independently address security exposures in the Internet and in an intranet, for example. Perhaps more importantly, the cascaded tunnels allow the cleartext contents of the datagram to be surfaced at the endpoints of each tunnel, where these endpoints comprise intermediate security gateways in the network path. Providing access to the cleartext contents allows the security gateways to perform valuable services such as content inspection and access control.

The present invention will now be described in more detail with reference to FIGS. 3–11.

Unlike a conventional "firewall", the security gateways which make use of the present invention do not assume that any of their external interfaces connect to "trusted" networks. This is illustrated in the representative computing environment configurations of FIGS. 3–8.

Figure 3:
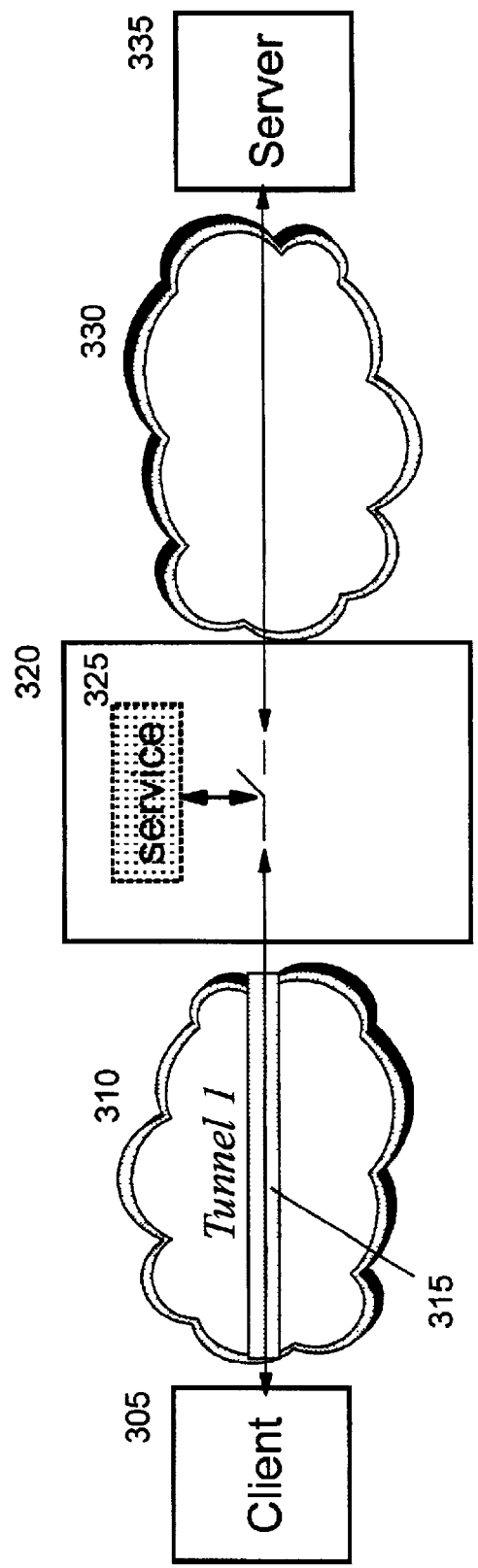
FIGS. 3–8 illustrate representative computing environment configurations in which IPSec is used in the prior art, and how the characteristics of those computing environment configurations change when using the preferred embodiment of the present invention.

FIG. 3 depicts a conventional remote access computing environment of the prior art, wherein a remote host 305 desires to communicate securely with a server 335. The remote host is located in the non-secure public Internet 310, whereas the server is located in an intranet 330 that is assumed to be secure. Thus, to communicate securely in this remote access environment, the remote host establishes a secure tunnel 315 to a security gateway 320, where this security gateway serves as a point of entry into the intranet. The transmitted packets are therefore protected over the Internet, but exposed within the intranet after being decrypted by the security gateway as it prepares the packets for delivery to the server. Because the security gateway decrypts the packets, it can provide a number of services (i.e. access control, network address translation, etc.) that require content inspection, as has been stated. This capability is represented graphically in FIG. 3 by the services element 325. (Note that while a single services element is shown in FIG. 3, this is merely for purposes of illustration: the services may actually be provided by a number of disjoint components, some of which may involve interactions with other components not shown in FIG. 3, such as policy databases.)

Figure 4:
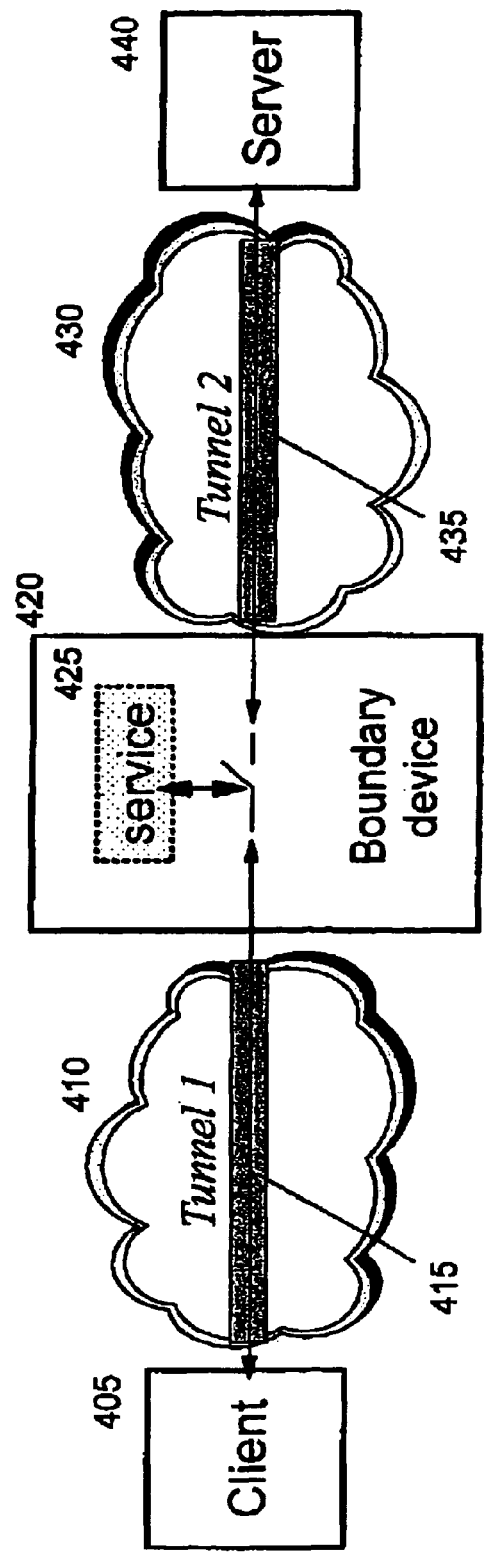

As stated earlier, security breaches may occur once a data packet enters the intranet environment of FIG. 3 because the data is transmitted in un-encrypted, un-protected form. FIG. 4 illustrates the improved remote access environment provided when using the present invention, whereby this security concern has been addressed. To transmit data between remote host 405 and server 440, through intermediate security gateway 420, two secure tunnels are now used. Tunnel 1 (element 415) securely transports data through the Internet 410, in a manner similar to that of the tunnel 315 in FIG. 3. Tunnel 2 (element 435) provides secure transport through the intranet 430. Security gateway 420 still has access to the data in cleartext form when using these two tunnels, retaining the ability to provide services (represented by element 425) of the type which were available in the environment of FIG. 3.

Figure 5:
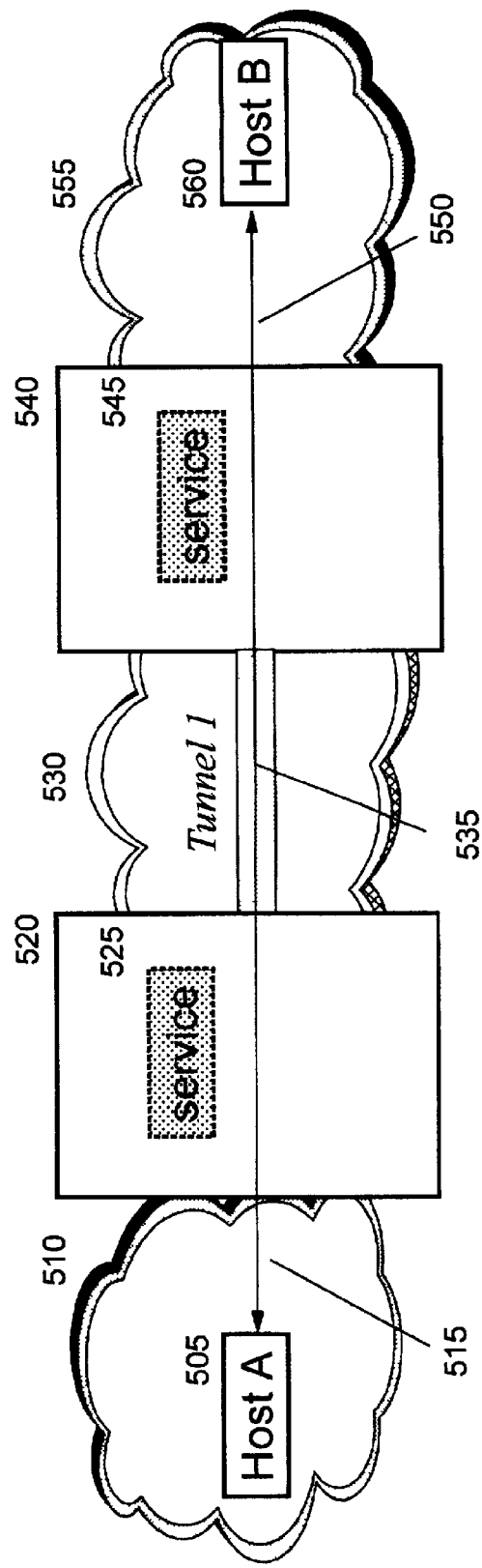

FIG. 5 depicts a conventional branch office computing environment of the prior art, wherein a host "A" 505 in one branch desires to communicate securely with a host "B" 560 in another branch. In this scenario, it is assumed that both branch offices use intranets 510, 555, which are assumed to be secure, but which are connected through the non-secure Internet 530. Security gateways 520, 540 protect entry to the respective intranets and provide the Internet connection. Thus, in the prior art, communication in this branch office environment uses a single secure tunnel 535 through the Internet (which is established between the security gateways), while the data is unprotected as it travels 515, 550 within the intranets. Because the packets are exposed in cleartext form to the gateways, each can provide services (illustrated as elements 525, 545) that require content inspection.

Figure 6:
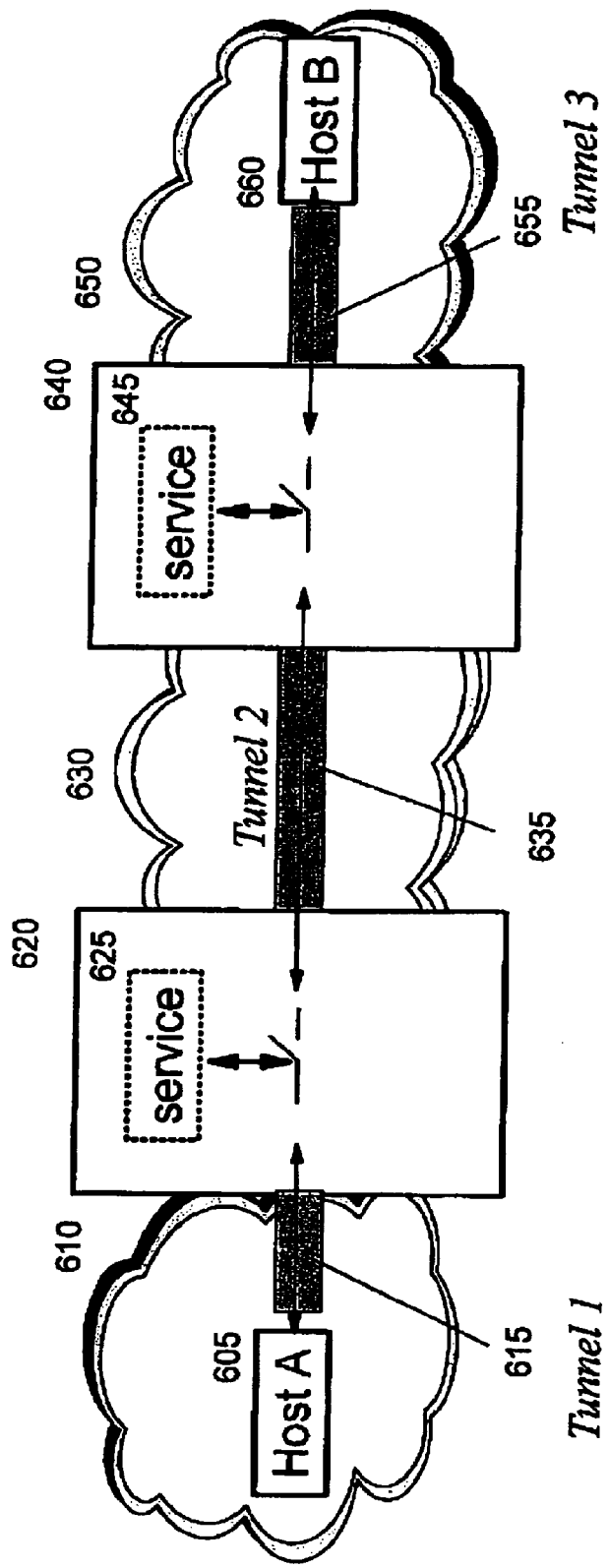

The security breaches that may occur within the intranet environments of FIG. 5 are avoided when using the improved branch office environment provided when using the present invention, which is illustrated in FIG. 6. Now, to transmit data between host A 605 and host B 660, three cascaded tunnels 615, 635, 655 are established. Thus, data is protected as it passes through host A's intranet 610 to intermediate security gateway 620, as it passes from there through the Internet 630, and as it passes from security gateway 640 on through host B's intranet 650. Yet, content inspection services (illustrated as elements 625, 645) can still be performed in the security gateways because the data is available to each in cleartext form.

Figure 7:
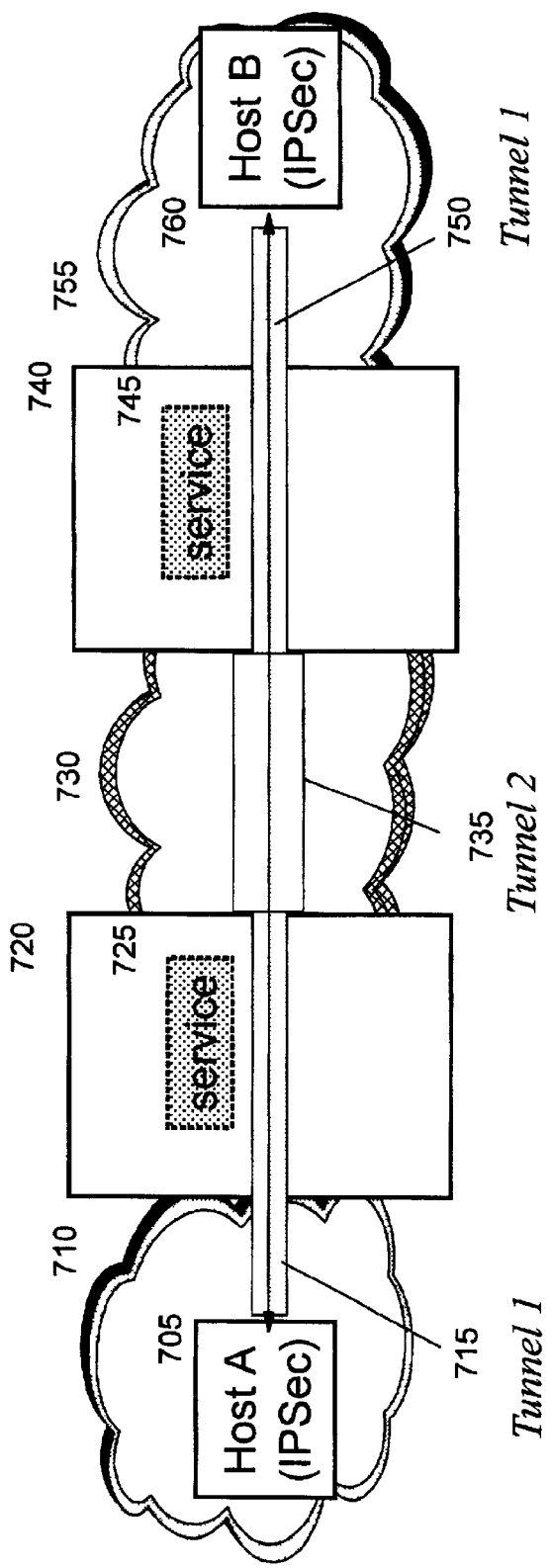

As another representative computing environment, FIG. 7 depicts a scenario where two business partners 705, 760 wish to communicate securely. In this scenario, it is assumed that both business partners must communicate across the Internet 730, and that (for purposes of illustration) two security gateways 720 and 740 are encountered when traversing a path through the Internet. Therefore, partner A 705 establishes a secure tunnel denoted at 715, 750 to partner B 760. Security gateway 720 may establish a second secure tunnel 735 through the Internet 730 to security gateway 740. Each business partner may reach a security gateway by an intranet or alternatively through the Internet. These networks are shown at 710, 755. While the business partners' data packets are now protected, it is not possible to provide services (illustrated as elements 725, 745) that require content inspection because the packets are not exposed in cleartext form to the gateways.

Figure 8:
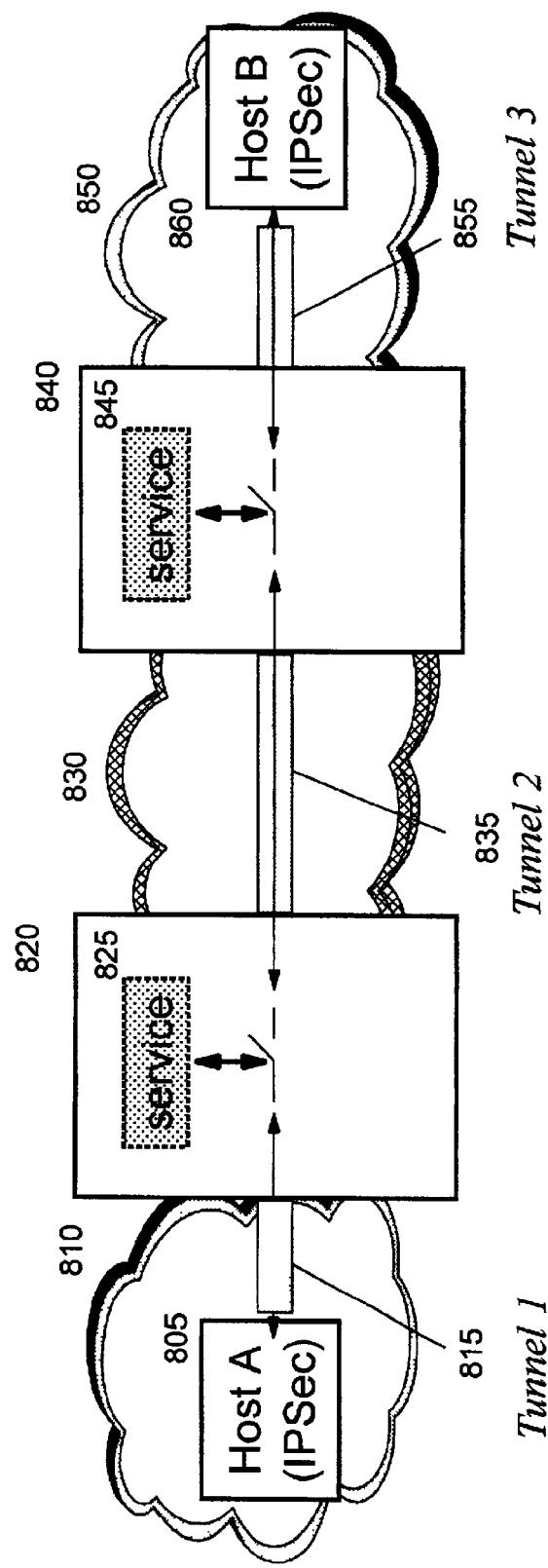

The improved business partner computing environment provided when using the present invention is shown in FIG. 8. As in FIG. 6, three cascaded tunnels 815, 835, 855 are established. Business partner A 805 securely transmits data through network 810 (which may be the Internet or an intranet) to security gateway 820 using the first tunnel 815. Security gateway 820 securely transmits data through the Internet 830 to security gateway 840 using the second tunnel 835, and security gateway 840 securely transmits the data through network 850 (which may be the internet or an intranet) to business partner B 860 using the third tunnel 855. End-to-end data protection is thereby provided, while still enabling content inspection services (illustrated as elements 825, 845) to be performed in the security gateways using the cleartext content of the data packets.

Figure 9:
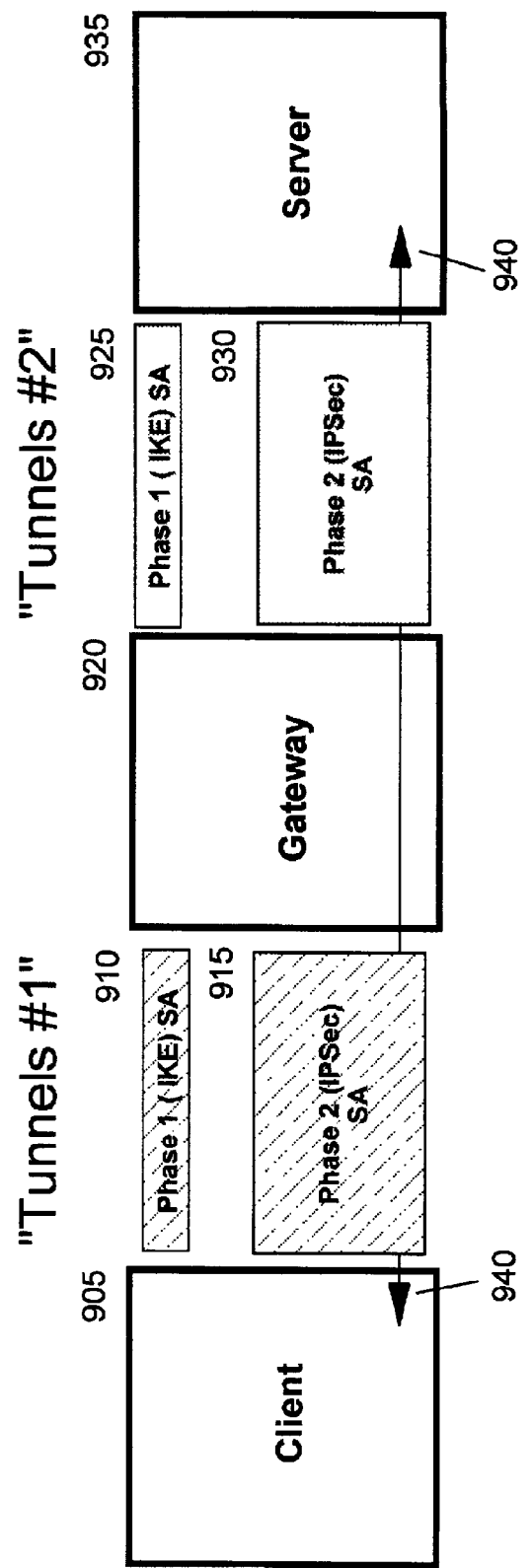
FIGS. 9 and 10 depict, at a high level, components used in the preferred embodiment and are used to describe operation of the present invention.

Referring now to FIG. 9, the technique with which the preferred embodiment of the present invention establishes the cascaded tunnels to provide improved end-to-end protection will now be described. FIG. 9 uses a configuration having three component devices: a client 905, a security gateway 920, and a server 935 with which the client wishes to communicate securely. As will be obvious to one of skill in the art, the technique of the present invention can easily be extended to end-to-end paths that are comprised of paths having four or more component devices, of which two are the source and destination hosts and the remainder are security gateways.

In the preferred embodiment, all component devices, including hosts and gateways, implement the IETF's IPSec/IKE suite of protocols and thus the present invention is described herein in terms of the security features provided by IKE in combination with IPSec. IKE and IPSec are described for use with the preferred embodiment because of the strong cryptographic techniques they inherently provide. It is therefore assumed that the component devices in FIG. 9, as well as those in the scenarios described above with reference to FIGS. 4, 6, and 8, will each implement and use the IKE and IPSec protocols, establishing both an IKE and an IPSec security association between each pair of components. (Note, however, that references to IPSec and IKE are for purposes of illustration and not of limitation: alternatively, the present invention may be used in environments wherein other security services providing analogous functionality are used.)

To provide consistent, end-to-end cascaded security associations or tunnels, the preferred embodiment of the present invention exploits the fact that the individual component devices have well-defined roles, both with regard to traffic flow and with regard to the IKE and IPSec protocols. The preferred embodiment then defines implementation constraints that make use of these well-defined roles to implement cascaded IPSec security associations. (IKE and IPSec are preferably used because of the strong cryptographic techniques they inherently provide.)

Referring again to FIG. 9, the well-defined roles for the component devices indicate that:

Client 905 is a source and sink point for user traffic (as shown by the double-ended arrow 940)

Server 935 is also a source and sink point for user traffic (shown by double-ended arrow 940)

Security gateway 920 provides a forwarding function for client-to-server datagrams; that is, it is neither a source nor a sink point for user traffic Client 905 will fill the role of "IKE Initiator" for both Phase 1 and Phase 2 negotiations with the gateway for tunnel pair 1 (shown at 910, 915)

Gateway 920 will fill the role of "IKE Responder" for both Phase 1 and Phase 2 negotiations with the client for tunnel pair 1

Gateway 920 will fill the role of "IKE Initiator" for both Phase 1 and Phase 2 negotiations with the server for tunnel pair 2 (shown at 925, 930)

Server 935 will fill the role of "IKE Responder" for both Phase 1 and Phase 2 negotiations with the gateway for tunnel pair 2

Figure 10:
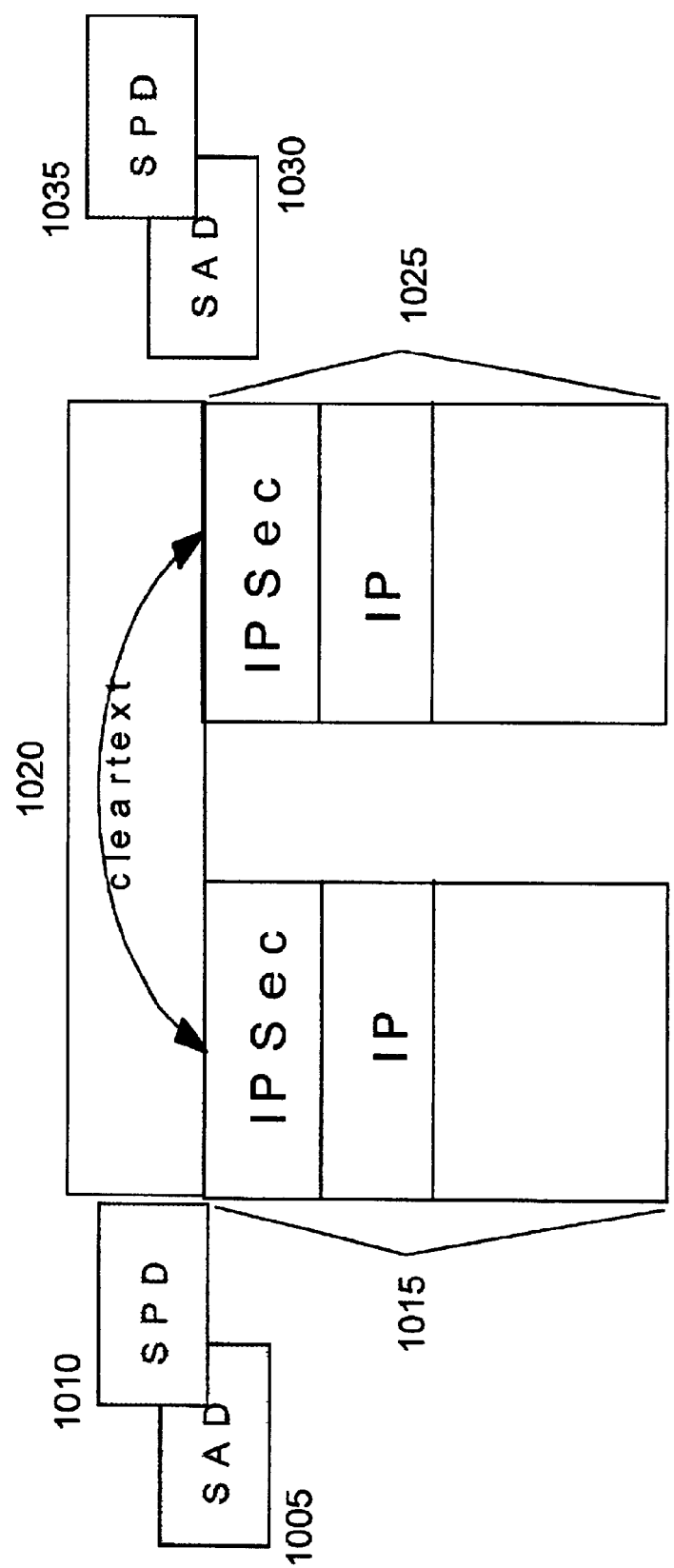

Referring now to FIG. 10, the gateway includes separate security association databases ("SAD") 1005, 1030 and security policy databases ("SPD") 1010, 1035 for each of the two interfaces upon which it receives end-to-end traffic flowing between the client and the server. The present invention is concerned with the SPDs, which (as in the prior art) contain entries defining the protection suites to be applied to a given datagram. The present invention interlocks the SPDs on either side of a security gateway to ensure that appropriate protection suites are applied to a given datagram along its entire network path as it travels between the client and server endpoints. (In configurations that include two or more security gateways along a given path, each such gateway will interlock the security policies applied at its ingress and egress ports in an identical manner.) In this situation, Prior to sending a data packet, Client 905 fills the role of "IKE Initiator", and will proceed to establish IKE and IPSec security associations with gateway 920. When the client initiates the Phase 2 IKE exchange (to set up the IPSec SA), it will now set the "IDci" parameter (representing the identification of the connection initiator) to the client's own IP address (say, for example, 9.1.2.3) since it is the source of the user data, and will also set the "IDcr" parameter (representing the identification of the connection responder) to reflect the server's IP address (say, for example, 8.1.2.3) since the server is the ultimate destination of the user data. Hence, with respect to the communications stack 1015, the SAD 1005 on the gateway's "tunnel 1 side" will record and locally store these values for the ID payloads. The ID parameters also specify the protocol and port to be protected in each direction of communication. Thus, these values from the IKE exchange are also stored on the tunnel 1 side, in the preferred embodiment. The IKE negotiations for the IPSec protection suite establish a Security Parameter Index (SPI) for each direction of transmission. This SPI is used to index into the tables where IKE stores the detailed information on addresses, protocols, and ports to be protected.

When a data packet arrives from the client at the gateway, the gateway can decrypt that packet using the decryption key corresponding to the IPSec SA (see element 915 of FIG. 9) established with the client on the tunnel 1 side. At this point in the process, the gateway is in possession of a cleartext copy of a datagram addressed from 9.1.2.3 to 8.1.2.3. In the prior art, the gateway would simply process this datagram as a conventional datagram to be forwarded. However, it is desirable to continue protecting the datagram on its next network segment Thus, the present invention enables additional security policy information to be used wherein the datagram will be forwarded on a secure cascaded tunnel on the tunnel 2 side of the gateway. The present invention therefore provides an additional element in the specification of the IKE/IPSec policy (to be stored in the gateway's ingress and egress SPDs 1010, 1035) that will direct the gateway to either use an existing cascaded tunnel, or if one is not available, to establish a pair of IKE and IPSec security associations that will provide this next cascaded tunnel. This additional policy element is specified in the form of a "cascading-enabled" flag which will be included in the security associations identified by the SPIs already established for each direction of transmission. When the cascading-enabled flag is set on, this indicates that the datagram is to be sent on a cascaded tunnel as it leaves the gateway's egress interface. Because the IDci and IDcr payloads are identical for each direction of transmission, the inclusion of an identical "cascading-enabled" flag in the security associations for both directions of transmission will also handle the cascading of SA tunnels for traffic flowing in the opposite direction, from server 935 to client 905.

As the datagram progresses on its way, the gateway's tunnel 2 side will see the cleartext datagram whose source is 9.1.2.3 and whose destination is 8.1.2.3. Consulting its SPD 1035 for the tunnel 2 side, the gateway will detect that this datagram is to be protected by IPSec (based on the underlying IPSec SA) and is to be cascaded (based on the cascading-enabled flag being set on). Therefore, the gateway will play the role of "IKE Initiator" for the purposes of establishing an IPSec SA with server 935 (i.e. the server having IP address 8.1.2.3). To establish the cascading of the tunnel 1 and tunnel 2 security associations, the gateway copies the IDci and IDcr values that apply to the already-established tunnel 1 IPSec SA, as well as the applicable protocol and port values in the preferred embodiment, and inserts these values into the appropriate ID payloads used in the gateway-to-server IKE exchanges. That is, the gateway, acting as initiator of the Phase 2 IPSec SA between itself and the server, will set IDci to 9.1.2.3 and will set IDcr to 8.1.2.3.

Figure 11:
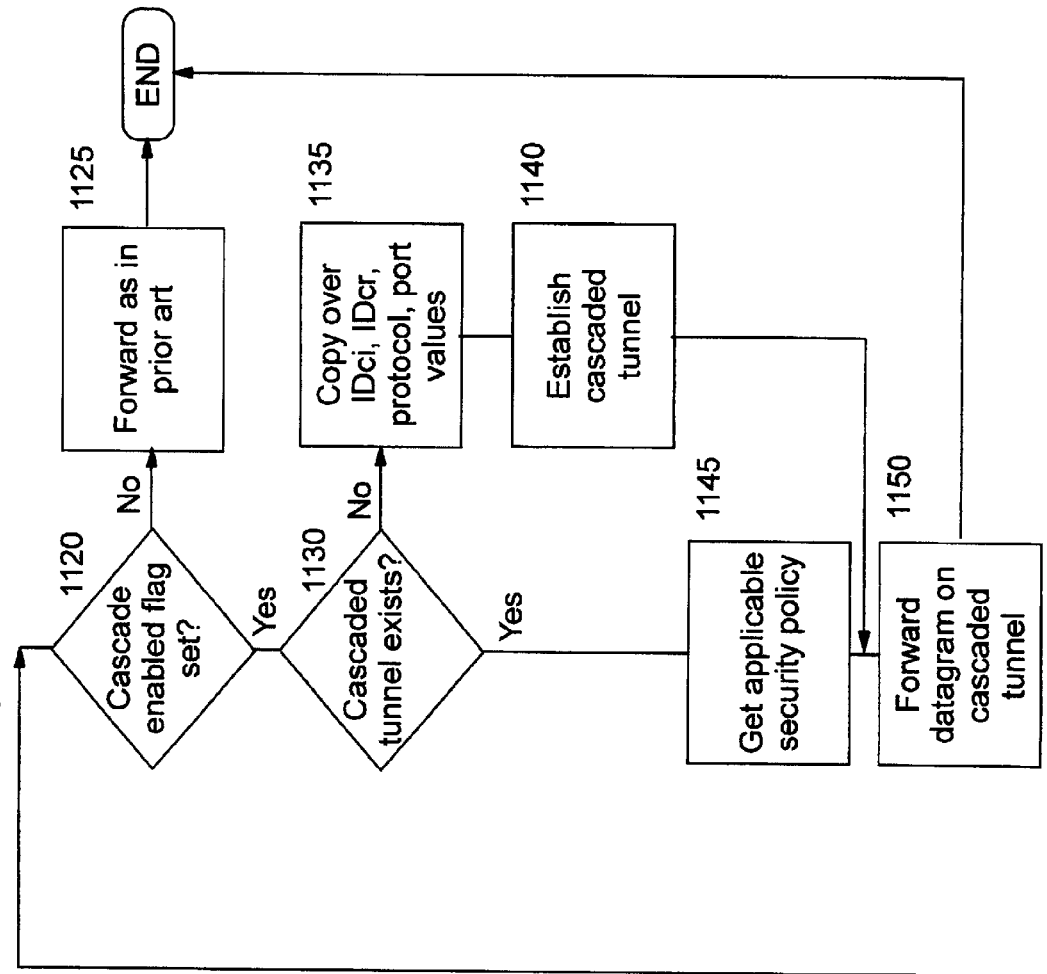
FIG. 11 provides a flowchart illustrating the logic that may be used in implementing cascaded tunnel support, according to the preferred embodiment of the present invention.
Figure 11:
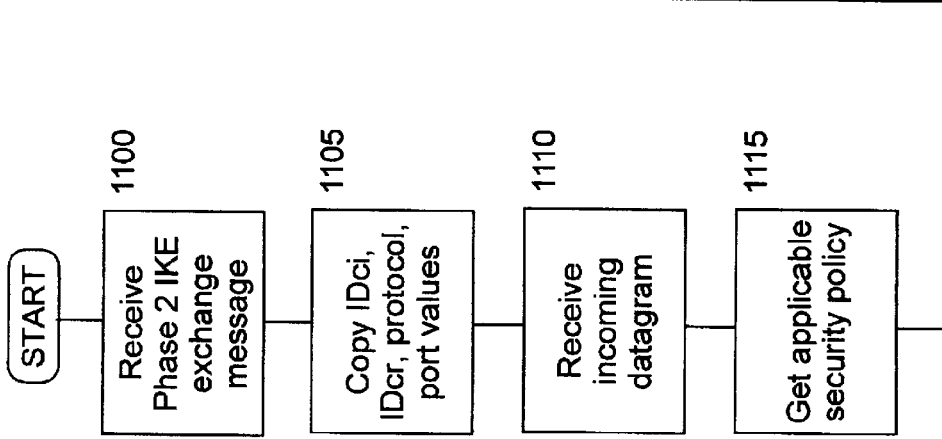

FIG. 11 illustrates the logic which may be used when a datagram arrives at a gateway providing the function of the present invention. At Block 1100, a Phase 2 IKE exchange message arrives. The gateway then copies the IDci and IDcr values, as well as the protocol and port values, from the payload of this message, and locally stores them in the SAD for its tunnel 1 side (Block 1105). An incoming datagram then arrives (Block 1110). At Block 1115, the gateway consults its SPD for the tunnel 1 side to determine the applicable security policy (according to prior art techniques).

As is known in the art, one or more security policies can be defined in IPSec, and stored in an SPD. Incoming packets are then compared to the stored security policy information. If a match is found (i.e. the policy to be applied to the packet can be determined), then the attributes of an SA associated with that policy are used to locate a suitable existing SA or to create a new SA having the required attributes. In this manner, the policy also determines whether the packet will be further processed by IPSec (such as performing encryption and/or authentication on the packet content), or whether the packet is to be forwarded without further IPSec processing, or simply discarded. A policy entry specifies the attributes of traffic that will use a particular SA, including the source and destination addresses of data packets. As an example, a security policy may specify that all packets from IP addresses in the range of 1.2.3.4 to 1.2.3.255 are to use an SA that provides encryption using a particular encryption algorithm, and/or that a particular encryption key should be used with those packets, and so forth. The security policy information is used in the manner taught by the prior art, with additional processing to account for the cascading-enabled flag defined by the present invention.

Block 1120 tests whether the cascading-enabled flag from the security policy found in Block 1115 is set on. If not, control transfers to Block 1125 where the packet will be forwarded as in the prior art. Control then exits the logic of FIG. 11 for this datagram. Subsequent datagrams received on this same tunnel may be processed, for example, beginning at Block 1110.

Preferably, the cascading-enabled flag value is set by a person such as a systems administrator or VPN administrator, or perhaps an automated process, to accurately reflect those source-destination pairs for which cascading should be used.

If the test in Block 1120 has a positive result, then processing continues to Block 1130 which checks to see if a cascaded outgoing tunnel to this destination already exists. If so, then the corresponding security policy for that tunnel is retrieved from the SPD on the gateway's tunnel 2 side (Block 1145). The security policies are applied, as in the prior art, and the datagram is then forwarded (Block 1150) over this cascaded outgoing tunnel. When the test in Block 1130 has a negative result, however, then the outgoing tunnel must be created. Control transfers to Block 1135, where the gateway copies the IDci and IDcr values (assuming that no network address translation is being performed), as well as the protocol and port values (assuming that no network port translation is being performed), from the SAD on its tunnel 1 side to the SAD on its tunnel 2 side. The gateway then establishes IKE and IPSec security associations to the destination (Block 1140), using these copied values in the appropriate ID payloads of the gateway-to-server IKE exchanges. (In the case where network address translation or network port translation is performed by the gateway, then the appropriate changes may be made to use the translated IP address or the translated port number in the ID payload either as this information is being stored in Block 1135, or as the outgoing cascaded tunnel is being established in Block 1140.) Processing then continues at Block 1150, where the datagram is forwarded over this new outgoing cascaded tunnel.

As has been demonstrated, the present invention provides a novel technique for providing end-to-end protection for user datagrams as they travel throughout a network, while still providing access to the datagram content at security gateways. This technique may be used with any IPSec-based VPNs, including those described in commonly-assigned U.S. patent (Ser. No. 09/718,041, filed Nov. 20, 2000), which is entitled "Integrated System for Network Layer Security and Fine-Grained Identity-Based Access Control", the disclosure of which is hereby incorporated herein by reference. While the IPSec and IKE specifications outline various configurations which are mandatory to support, as previously stated, these are limited to parameters such as tunnel/transport modes, and nested tunnels. The prior art does not provide teachings which interlock the cascaded tunnels as disclosed herein, using a flag which explicitly enables or disables cascading, nor does it teach the use of the IDci and IDcr values across a cascaded set of IKE negotiations as disclosed herein. Furthermore, the prior art does not teach using the specification of IKE initiator and responder roles as a mechanism for controlling the orderly establishment of a set of cascaded tunnels, as disclosed herein.

U.S. Pat. No. 5,940,591, entitled "Apparatus and Method for Providing Network Security", may provide a type of cascading; however, it uses logic that is positioned in the upper layers of a communication stack for providing improved network security, and does not allow participation of the end systems in the process, as contrasted to the present invention which uses network layer security and participation by the end systems.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

What is claimed is:

1. A computer program product for providing end-to-end protection for datagrams in a computer networking environment, the computer program product embodied on one or more computer-readable media and comprising:
computer-readable program code means for protecting each of a plurality of network segments that comprise a network path from a datagram originator to a datagram destination, further comprising:
computer-readable program code means for establishing a first protected network segment from the datagram originator to a first of one or more gateways in the network path;
computer-readable program code means for cascading zero or more protected gateway-to-gateway segments along the network path, each of the gateway-to-gateway segments being cascaded from one of the gateways in the network path to a next successive one of the gateways; and
computer-readable program code means for cascading a last protected network segment from a final one of the gateways to the datagram destination, wherein the final gateway is the first gateway if no gateway-to-gateway segments are required,
wherein each of the gateways retains cleartext access to datagrams sent on the network path.

2. The computer program product according to claim 1, wherein the computer-readable program code means for establishing and the computer-readable program code means for cascading further comprise computer-readable program code means for establishing security associations which use strong cryptographic techniques.

3. The computer program product according to claim 2, wherein the strong cryptographic techniques used for the security associations are provided by protocols known as Internet Key Exchange and IP (Internet Protocol) Security Protocol.

4. The computer program product according to claim 3, wherein the datagram originator and the gateways that perform the computer-readable program code means for cascading each act in an IKE initiator role.

5. The computer program product according to claim 1, wherein the computer-readable program code means for cascading further comprises computer-readable program code means for using identifying information from the first protected network segment as identifying information of the protected gateway-to-gateway segments and the last protected network segment.

6. The computer program product according to claim 5, wherein the identifying information further comprises addresses of the datagram originator and the datagram destination.

7. The computer program product according to claim 6, wherein the identifying information further comprises a protocol identification and a port number used for the first protected network segment.

8. The computer program product according to claim 5 or claim 6, wherein the identifying information is copied from an inbound side of each gateway to an outbound side of that gateway.

9. The computer program product according to claim 5, wherein the identifying information may be altered by zero or more of the gateways.

10. The computer program product according to claim 1, wherein the datagram originator and the gateways that perform the computer-readable program code means for cascading each act in an initiator role for a protocol known as Internet Key Exchange.

11. The computer program product according to claim 1, wherein any of the gateways may perform services on the cleartext datagram.

12. The computer program product according to claim 1, wherein operation of the computer-readable program code means for cascading may be selectively enabled for any particular network path.

13. The computer program product according to claim 12, wherein the selective enablement occurs by setting a cascading-enabled flag for the first protected network segment, and wherein datagrams sent on the network path are not protected using cascaded protected segments when the computer-readable program code means for cascading is disabled.

14. The computer program product according to claim 1, wherein each of the protected network segments has a security policy associated therewith and wherein the security policies may vary among the protected network segments.

15. A system for providing end-to-end protection for datagrams in a computer networking environment, comprising:
    means for protecting each of a plurality of network segments that comprise a network path from a datagram originator to a datagram destination, further comprising:
        means for establishing a first protected network segment from the datagram originator to a first of one or more gateways in the network path;
        means for cascading zero or more protected gateway-to-gateway segments along the network path, each of the gateway-to-gateway segments being cascaded from one of the gateways in the network path to a next successive one of the gateways; and
        means for cascading a last protected network segment from a final one of the gateways to the datagram destination, wherein the final gateway is the first gateway if no gateway-to-gateway segments are required,
    wherein each of the gateways retains cleartext access to datagrams sent on the network path.

16. The system according to claim 15, wherein the means for establishing and the means for cascading comprise means for establishing security associations which use strong cryptographic techniques.

17. The system according to claim 16, wherein the strong cryptographic techniques used for the security associations are provided by protocols known as Internet Key Exchange and IP (Internet Protocol) Security Protocol.

18. The system according to claim 17, wherein the datagram originator and the gateways that perform the means for cascading each act in an IKE initiator role.

19. The system according to claim 15, wherein the means for cascading further comprises means for using identifying information from the first protected network segment as identifying information of the protected gateway-to-gateway segments and the last protected network segment.

20. The system according to claim 19, wherein the identifying information further comprises addresses of the datagram originator and the datagram destination.

21. The system according to claim 19 or claim 20, wherein the identifying information is copied from an inbound side of each gateway to an outbound side of that gateway.

22. The system according to claim 19, wherein the identifying information may be altered by zero or more of the gateways.

23. The system according to claim 20, wherein the identifying information further comprises a protocol identification and a port number used for the first protected network segment.

24. The system according to claim 15, wherein the datagram originator and the gateways that perform the means for cascading each act in an initiator role for a protocol known as Internet Key Exchange.

25. The system according to claim 15, wherein any of the gateways may perform services on the cleartext datagram.

26. The system according to claim 15, wherein operation of the means for cascading may be selectively enabled for any particular network path.

27. The system according to claim 26, wherein the selective enablement occurs by setting a cascading-enabled flag for the first protected network segment, and wherein datagrams sent on the network path are not protected using cascaded protected segments when the means for cascading is disabled.

28. The system according to claim 15, wherein each of the protected network segments has a security policy associated therewith and wherein the security policies may vary among the protected network segments.

29. A method of providing end-to-end protection for datagrams in a computer networking environment, comprising steps of:
    protecting each of a plurality of network segments that comprise a network path from a datagram originator to a datagram destination, further comprising steps of:
        establishing a first protected network segment from the datagram originator to a first of one or more gateways in the network path;
        cascading zero or more protected gateway-to-gateway segments along the network path, each of the gateway-to-gateway segments being cascaded from one of the gateways in the network path to a next successive one of the gateways; and
        cascading a last protected network segment from a final one of the gateways to the datagram destination, wherein the final gateway is the first gateway if no gateway-to-gateway segments are required,
    wherein each of the gateways retains cleartext access to datagrams sent on the network path.

30. The method according to claim 30, wherein the establishing step and the cascading step further comprise the step of establishing security associations which use strong cryptographic techniques.

31. The method according to claim 31, wherein the strong cryptographic techniques used for the security associations are provided by protocols known as Internet Key Exchange and IP (Internet Protocol) Security Protocol.

32. The method according to claim 31, wherein the datagram originator and the gateways that perform the cascading step each act in an IKE initiator role.

33. The method according to claim 29, wherein the cascading step further comprises the step of using identifying information from the first protected network segment as identifying information of the protected gateway-to-gateway segments and the last protected network segment.

34. The method according to claim 33, wherein the identifying information further comprises addresses of the datagram originator and the datagram destination.

35. The method according to claim 34, wherein the identifying information further comprises a protocol identification and a port number used for the first protected network segment.

36. The method according to claim 33 or claim 34, wherein the identifying information is copied from an inbound side of each gateway to an outbound side of that gateway.

37. The method according to claim 33, wherein the identifying information may be altered by zero or more of the gateways.

38. The method according to claim 29, wherein the datagram originator and the gateways that perform the cascading step each act in an initiator role for a protocol known as Internet Key Exchange.

39. The method according to claim 29, wherein any of the gateways may perform services on the cleartext datagram.

40. The method according to claim 29, wherein operation of the cascading step may be selectively enabled for any particular network path.

41. The method according to claim 40, wherein the selective enablement occurs by setting a cascading-enabled flag for the first protected network segment, and wherein datagrams sent on the network path are not protected using cascaded protected segments when the cascading step is disabled.

42. The method according to claim 29, wherein each of the protected network segments has a security policy associated therewith and wherein the security policies may vary among the protected network segments.

43. A computer program product for providing end-to-end protection for datagrams in a computer networking environment, the computer program product embodied on one or more computer-readable media and comprising:
   computer-readable program code means for protecting each of a plurality of network segments that comprise a network path from a datagram originator to a datagram destination, further comprising:
      computer-readable program code means for establishing a first protected network segment from the datagram originator to a first of a plurality of gateways in the network path;
      computer-readable program code means for cascading one or more protected gateway-to-gateway segments along the network path, each of the gateway-to-gateway segments being cascaded from one of the gateways in the network path to a next successive one of the gateways, using identifying information from the first protected network segment as identifying information of the protected gateway-to-gateway segments, wherein the identifying information is copied from an inbound side of each gateway to an outbound side of that gateway; and
      computer-readable program code means for cascading a last protected network segment from a final one of the gateways to the datagram destination, using the identifying information from the first protected network segment as identifying information of the last protected network segment,
   wherein each of the gateways retains cleartext access to datagrams sent on the network path.

44. A system for providing end-to-end protection for datagrams in a computer networking environment, comprising:
   means for protecting each of a plurality of network segments that comprise a network path from a datagram originator to a datagram destination, further comprising:
      means for establishing a first protected network segment from the datagram originator to a first of a plurality of gateways in the network path;
      means for cascading one or more protected gateway-to-gateway segments along the network path, each of the gateway-to-gateway segments being cascaded from one of the gateways in the network path to a next successive one of the gateways, using identifying information from the first protected network segment as identifying information of the protected gateway-to-gateway segments, wherein the identifying information is copied from an inbound side of each gateway to an outbound side of that gateway; and
      means for cascading a last protected network segment from a final one of the gateways to the datagram destination, using the identifying information from the first protected network segment as identifying information of the last protected network segment,
   wherein each of the gateways retains cleartext access to datagrams sent on the network path.

45. A method of providing end-to-end protection for datagrams in a computer networking environment, comprising steps of:
   protecting each of a plurality of network segments that comprise a network path from a datagram originator to a datagram destination, further comprising steps of:
      establishing a first protected network segment from the datagram originator to a first of a plurality of gateways in the network path;
      cascading one or more protected gateway-to-gateway segments along the network path, each of the gateway-to-gateway segments being cascaded from one of the gateways in the network path to a next successive one of the gateways, using identifying information from the first protected network segment as identifying information of the protected gateway-to-gateway segments, wherein the identifying information is copied from an inbound side of each gateway to an outbound side of that gateway; and
      cascading a last protected network segment from a final one of the gateways to the datagram destination, using the identifying information from the first protected network segment as identifying information of the last protected network segment,
   wherein each of the gateways retains cleartext access to datagrams sent on the network path.

* * * * *

UNITED STATES PATENT AND TRADEMARK OFFICE
CERTIFICATE OF CORRECTION

PATENT NO. : 6,931,529 B2
DATED : August 16, 2005
INVENTOR(S) : Charles A. Kunsinger It is certified that error appears in the above-identified patent and that said Letters Patent is hereby corrected as shown below:

Column 11,
Line 44, change "segment Thus" to -- segment. Thus, --;

Column 15,
Line 35, change "cascading comprise" to -- cascading further comprises --;

Column 16,
Line 36, change "claim 30, wherein" to -- claim 29, wherein --;
Line 40, change "claim 31, wherein" to -- claim 30, wherein --.

Signed and Sealed this

Sixteenth Day of May, 2006

JON W. DUDAS
*Director of the United States Patent and Trademark Office*